March 6, 1934.  Z. ZIVKOVIC  1,950,338

ROCKING HORSE, ROCKING CHAIR, AND THE LIKE

Filed July 31, 1933    2 Sheets-Sheet 1

Z. Zivkovic
INVENTOR

By: Marks & Clerk
Attys.

March 6, 1934.    Z. ZIVKOVIC    1,950,338
ROCKING HORSE, ROCKING CHAIR, AND THE LIKE
Filed July 31, 1933    2 Sheets-Sheet 2
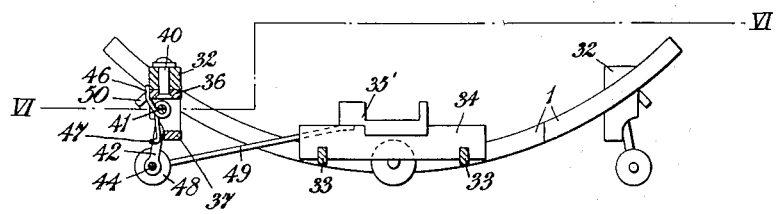
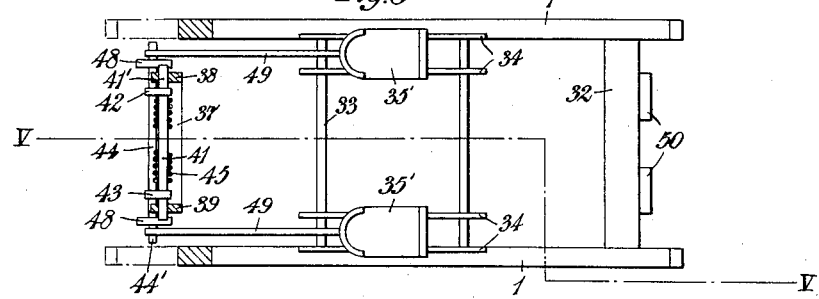
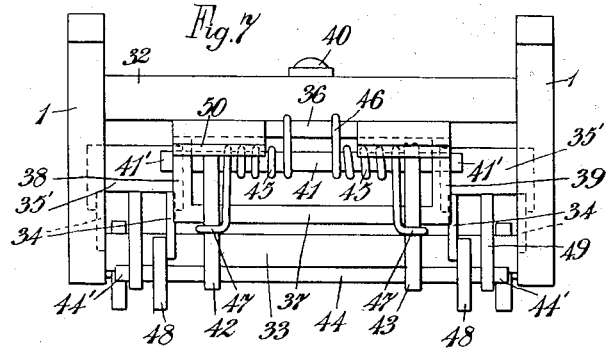
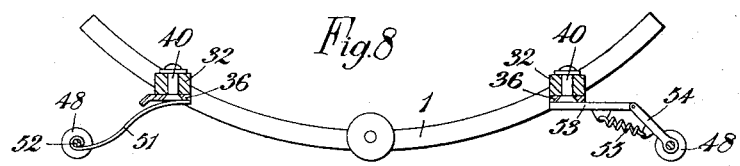
Z. Zivkovic
INVENTOR
By: Marks & Clerk
Attys.

Patented Mar. 6, 1934

1,950,338

UNITED STATES PATENT OFFICE 1,950,338

ROCKING HORSE, ROCKING CHAIR, AND THE LIKE

Zaharije Živković, Belgrade, Yugoslavia

Application July 31, 1933, Serial No. 683,063
In Yugoslavia January 25, 1933

20 Claims. (Cl. 272—53)

This invention relates to various improvements in rocking horses, rocking chairs and the like, more particularly in those disclosed in my Patent No. 1,891,131.

One improvement consists in the fact that instead of using, as hitherto, two cylinders with axially moving rods, which are provided at one end with auxiliary wheels or rollers, and at the other end compress helical springs mounted in the said cylinders, I now use only one such cylinder, mounted in one or more bearings in such a manner as to be capable of axial rotation, together with a rod co-axially mounted therein, in such a way that it can reciprocate up and down, compressing a spring also mounted in the said cylinder, the rod having at its outer end either a wheel or a cross bar or axle on the ends of which two auxiliary wheels are mounted. The cylinder may be of the general construction hitherto adopted, only its length may be considerably reduced. In this case also it is possible to arrange a centrally mounted rod capable of reciprocating in the cylinder while compressing therein a coiled spring, and may also be provided either with a wheel at its outer end, or with a cross bar or axle provided at its ends with two auxiliary wheels or rollers as explained above.

According to this improvement, the rod, which carries on its end either a wheel or a wheeled cross-bar, cannot rotate relatively to the cylinder, but is compelled to rotate together with the cylinder itself, so that the steering of the rocking horse is effected by axially turning the cylinder or cylinders. For this purpose the rod is preferably of polygonal cross-section and passes through corresponding openings in the lower end of the cylinder or cylinders.

In cases where a very short cylinder is employed, it is not necessary for it to be able to rotate in its bearing, and as a matter of fact, it may be fixed, as the rocking horses equipped in this manner are usually intended for use in nurseries, where steering is not a necessity.

If a rocking horse is to be guided, it is provided with a long cylinder and reciprocating bar, and the cross bar or axle fixed to the outer end of the reciprocating rod carries at its end two wheels. The cylinder is mounted in bearings and constrained to turn about its axis by means of pedals connected by strings or cables to the ends of the cross bar of the reciprocating rod. These steering cables are preferably carried over a fixed support to keep them taut. The pedals are of special design, as shown in the drawings and are mounted on a fixed part of the lower frame of the rocking horse, for example, on a tie or a treadle connecting the two rockers or the like. These steering pedals each consist of a cylinder containing a coiled spring, which acts on a rod, pushing it upwards. At the top end of this rod there is the pedal proper of any convenient form. When a pedal is trodden on, the cable connecting it with the cross bar is tightened, and by further advance of the pedal the rod is lowered still further, tightening the cable still more, which then pulls in that end of the cross bar to which the cable is fastened. Of course there are usually two such pedals, one on each side, and within reach of the rider's feet.

In addition to brakes already known for stopping or slowing down the movements of a rocking horse on inclines, there may be provided one or two additional brakes in the form of wooden boards connected at one end to the frame by suitable hinges, while their free end is lifted off the ground by means of a suitable spring. When this brake board is trodden on the action of the spring is overcome and the free end of the board touches the ground, slowing down the movements of the horse. Freeing the pedal lifts its end off the ground and the braking is terminated.

The rear ends of the rockers may be provided with bumpers or buffers of rubber or springs, or may be provided with wheels either of the same type as the front wheels, that is to say, with cylinders and springs, or with flat leaf springs, or with any other shock-absorbing device.

The middle wheels are fixed to an axle and are completely shielded. They are arranged to turn only in one direction, that is to say, only in the forward direction. Rotation in the opposite direction is prevented by means of spirals, or ratchet wheels and pawls associated with the said middle wheels, or in any other known manner.

A further feature of the invention consists in the fact that the compression cylinders in which the rods carrying the auxiliary wheels are arranged to reciprocate axially while under the action of springs or other like means in the said cylinders have been entirely omitted, and have been replaced by a frame, preferably of rectangular shape, one of the longer sides of which serves as a turning axle for the entire frame, the said axle turning within definite limits in bearings provided in a cross bar or the like, which is arranged between the rockers of the horse. One or two helical springs are coiled about this member of the frame, one end of the said springs being attached to some fixed point, while the other end extends along the shorter member of the rectangular frame, pressing it down and tending to bring it into the vertical position, that is to say, up to the furthest limit, and for the drive the most favourable limit, of the turning movement of the frame. The other longer member of the driving frame is provided with a left and a right extension, on which auxiliary wheels are mounted. In certain cases only one auxiliary wheel may be mounted on the said frame member, which is then located within the plane passing through the longitudinal axis of the horse. Similar arrangements may be provided behind the horse and symmetrically mounted with respect to the transverse axis of the horse.

The entire construction may be so arranged that the said wheel-carrying frame may turn about a vertical axis to provide for steering during the ride.

In order to facilitate guiding the horse while riding, an auxiliary frame is provided which is pivotally mounted on a cross bar arranged between the rocking arches. This auxiliary frame is capable of turning about a vertical axis passing through its pivot and carries the above-described driving frame, with its wheels. The upper side of this frame, about which the springs are coiled, has two extensions, which are arranged to turn in bearings provided in the said auxiliary frame. In this manner the driving frame is free to oscillate forwards and backwards, while at the same time it may turn, together with the auxiliary frame, about a vertical axis for steering purposes.

To effect steering, the abovementioned lower extensions of the driving frame are connected by means of metallic rods to two pedals sliding on guides arranged on both sides of the horse. These pedals are actuated forwards and backward by the rider's feet resting on them. When the rider pulls on the right pedal, for instance, it slides back on the guides, pulling after it the rod connecting it to the right-hand side of the driving frame, while at the same time the left pedal and its connecting rod are pushed forward. In this manner the guiding of the horse is effected. The driving means arranged at the rear end of the horse need not be rotatable about a vertical axis.

Instead of the arrangement described above I may provide a curved flat spring which carries at one of its ends an auxiliary wheel, while the other end may be fixed to a cross bar arranged between the rockers. A similar spring and wheel may likewise be arranged at the rear end of the horse.

Instead of only one curved flat spring, there may be provided two such springs arranged one beside the other, both of which may carry auxiliary wheels at their free ends. In such a case also it is possible to provide guiding means. For this purpose the two springs are fastened to a plate or bar pivotally connected to a cross piece arranged between the rockers. In addition, the wheels mounted at the free ends of the flat springs may be actually carried on a common axle, thus forming a driving frame, which then consists of the two flat springs, the common wheel axle, and the upper bar, which is capable of turning about a vertical axis. The guiding would be effected in the same manner as has been described for the previous example, that is to say, by means of metallic rods connected at one end to pedals and at the other end to the ends of the common wheel axle.

The driving element may be constructed in the form of articulated links, one of which carries at its free end the said auxiliary wheel, while the other link is rigidly connected to a cross bar or the like, arranged between the rockers. A coiled spring acts upon the link with the wheel, tending to make it approach the fixed link.

It should be understood that the articulated links may also be mounted in pairs, both at the front and the rear ends of the horse, and the front system may be easily arranged to pivot about a vertical axis in the same manner as in previous examples.

A few embodiments of the invention are diagrammatically illustrated in the accompanying drawings. In the drawings the image of the horse had been omitted, only wooden arches being represented together with associated rolling and guiding devices.

Fig. 5 is a vertical longitudinal section along the line V—V in Fig. 6;

Fig. 6 is a horizontal plan view in section along the line VI—VI in Fig. 5;

Fig. 7 represents a front view of the parts shown in Figs. 5 and 6; and

Fig. 8 is a longitudinal section showing two modified embodiments of this invention.

Figure 1:
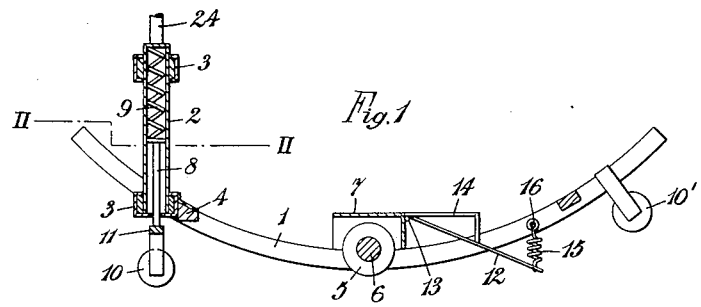
Fig. 1 shows a longitudinal section of an embodiment taken on the line I—I in Fig. 2.

In the drawings, 1 denotes the wooden rockers, 2 is a spring cylinder, 3 is a bearing in which the cylinder 2 turns, 4 is a transverse tie bar carrying the bearing 3, 5 designates central wheels, and 6 their axle, with which they revolve. 7 is a shield for the wheels 5, and serves at the same time at a footboard which can be widened in a forward direction as desired. 8 represents a rod upon which a thrust is exerted by a spring 9 mounted inside the cylinder 2. The rod 8 is of polygonal cross section and carries on its lower end an auxiliary wheel, or is provided with a horizontal cross bar 11 carrying two auxiliary wheels 10 at its ends. As the arrangement with only one auxiliary wheel on the reciprocating rod is simpler, I have shown the arrangement with two auxiliary wheels in the drawings, so that its construction may be obvious to those skilled in the art.

The covering tread foot-board 7 carries two foot brakes 12 connected to it by means of hinges 13. 14 denotes braking pedals mounted on the brakes 12 in such a manner that when these pedals are at rest they take up an approximately horizontal position. 15 denotes springs which are connected at one end to the brakes 12 and at the other end to a cross bar 16, arranged between the wooden rockers 1. These springs 15 keep the brakes 12 in their normal position, shown in Figs. 1 and 2.

Figure 3:
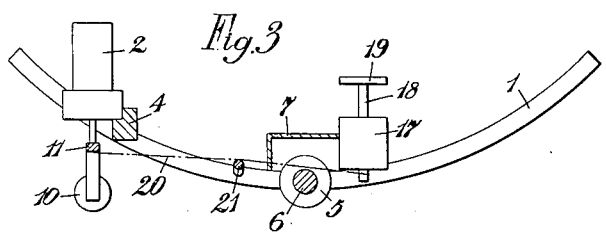
Fig. 3 represents a longitudinal section of another embodiment taken on the line III—III in Figure 4.
Figure 4:
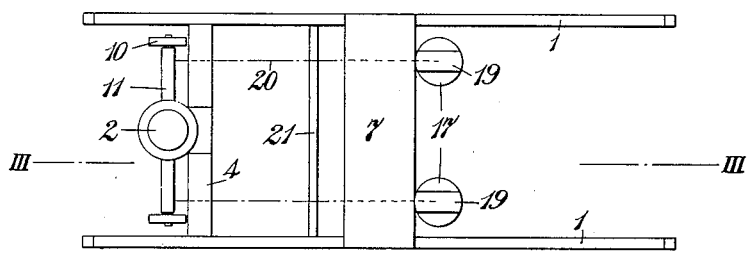
Fig. 4 represents a plan view of the embodiment shown in Fig. 3.

When short cylinders 2 are used, as represented in Figs. 3 and 4, the steering is accomplished by means of pedals and cables connected with the front cross bar 11 carrying the auxiliary wheels 10.

17 (in Figs. 3 and 4), represents cylinders fixed on the foot board 7. 18 are rods sliding in the cylinders 17 and carrying on top pedals 19. These rods are under the action of a spring which constantly tends to raise them. These springs are not shown in the drawings, but their arrangement in the cylinders and their action on the rods passing through the cylinders is obvious. 20 denotes cables attached at one end to the cross bar 11 and at the other end to the rods 18. 21 denotes a cross piece, arranged between the wooden rockers, over which the cables 20 are stretched.

Figure 2:
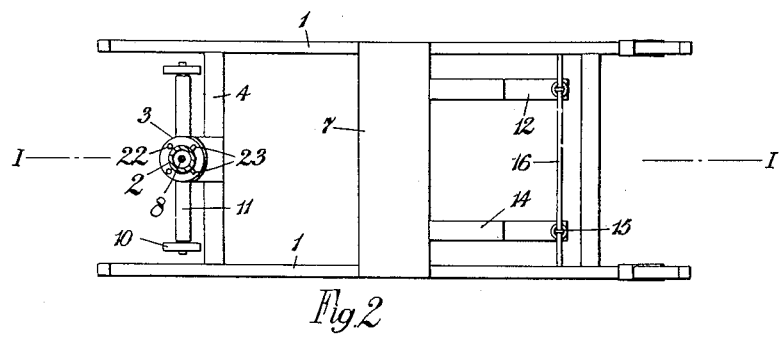
Fig. 2 represents a plan view of the embodiment shown in Figure 1 as seen on the line II—II in Fig. 1.

To limit the rotation of the cylinders 2 the bearings 3 are provided with shoulders 22, represented in Fig. 2 by small circles indicating the limits to which the rotation of the cylinder 2 is restricted. The cylinders 2 are provided with one or two pins 23 or the like, which come to rest on the shoulders 22, preventing further turning of the cylinders. Limitation of the turning movement of the cylinders 2 is necessary in order to prevent the cross bar taking up a position parallel to the longitudinal axis of the rocking horse, which would in such a case overturn, perhaps under most dangerous conditions, for instance, on an incline or at a sharp turning.

The rocking horse may also be guided by means of a cross bar or handle 24 fixed at the top of the cylinder 2, as shown in Fig. 1. This handle is usually parallel to the cross bar 11, but may be bent in any convenient manner to have its ends within easy reach of the rider's hands. This arrangement is not shown in the drawings, as this description is considered to be sufficient.

The handle bar 24 may be arranged in the horse's mouth, with a bridle tied to it; and this arrangement gives the bar secured to the top end cover of the cylinder 2 by means of screws and provided with a bridle.

The rear ends of the wooden rockers 1 are provided with bumpers or buffers in the form of wheels 10' which may be constructed and mounted in the same manner as the auxiliary wheels 10, that is to say, they may be mounted on rods moving in cylinders in which they compress suitable springs. These wheels may alternatively be mounted on flat springs, or on any other shock-absorbing device.

Instead of the cylinder 2 and its associated parts 11, 3, 9 and so forth, the uni-directional movement of the front auxiliary wheels may be ensured by means of spiral or flat springs of any form, the main feature being their ability to contract and expand during the rocking movement of the horse, and to enable the raising and lowering of the front wheels to effect the forward movement of the horse.

It is to be noted that the cylinders 17, which are arranged on the rear edge of the foot board 7 according to Figs. 3 and 4, may alternatively be mounted on its front edge, to facilitate the use of foot brakes. It may likewise be noted that all the wheels may be provided with rubber tyres to eliminate noise and shocks.

In Figs. 5, 6 and 7, 1 denotes as before the wooden rockers, 32 are cross ties connecting these rockers 1 with one another, 33 are cross bars, carrying guides 34, upon which slide pedals 35'. 36 and 37 are the longer sides or members of an auxiliary frame, and 38 and 39 are the shorter sides of the same frame. The side 36 is arranged to turn about a vertical pivot 40 entering the cross bar 32, so that in turning it may carry with it all the frame members 36, 37, 38 and 39. This auxiliary frame embraces a driving frame, which is composed of frame members 41, 42, 43 and 44 and which is capable of swinging about extensions 41' journalled in the sides 38 and 39 of the auxiliary frame. The frame member 41 carries one or two coiled springs 45, the ends 46 of which are attached to the auxiliary frame members 36, while their other ends 17 extend down and act upon the frame members 42 and 43. The member 44 of the driving frame has extensions 44' to left and right, as shown in Fig. 7, upon which auxiliary running wheels 48 are mounted. Metallic guide rods 49 connect these extensions 44' with the pedals 35'. Stops 50 limit the forward movement of the members 42, 43 of the driving frame, while the inward movement of the driving frame is limited by the member 37 of the auxiliary frame, as shown in Figs. 5, 6 and 7.

In the modified construction form shown in Fig. 8 a curved blade spring 51 carries at one end the wheel 48, while by the other end it is rigidly attached either directly to the cross bar 32 or to the bar 36 which is arranged to turn about the pivot 40. In this latter case two flat springs 51 are used, which, together with the bar 36 and the common axle 52 of wheels 48, form the driving frame. Steering is effected in the same manner as in previous examples.

Figure 8 also shows another modification of this invention, where the driving element consists of two articulated links 53 and 54, between which a coiled spring 55 is stretched. The link 53 is rigidly connected either to the cross bar 32 or to the plate 36, which is capable of turning for guiding purposes about a pivot 40 mounted on the cross bar 32. The link 54 is provided at its free end with a wheel 48. In this case also the driving elements may be combined in pairs, one pair being provided at the front and the other at the rear end, just as in previous examples.

It will be understood that various driving arrangements represented in the drawings may be combined without in the least departing from the spirit of this invention.

Instead of the constructions described for the front and rear auxiliary wheels, many other constructions of different kinds and shapes may be used, together with spiral or flat springs or with articulated links with or without springs or other elements, which would enable the auxiliary wheels to rise or descend within certain limits during the rocking movement of the horse. When the forward wheels ascend, the rear wheels descend and vice versa, for the purpose of:—

(a) Producing a force component, in the mutual relation between the front and central wheels, when the rider rocks forward and the front wheels rise, which would produce forward movements of the horse, while when these front wheels descend, to facilitate rider's backward rocking, and (b) Absorbing shocks which would arise in the relation between the central and rear auxiliary wheels, due to the rider rocking backward, and to facilitate the rider's forward movement while these rear wheels descend.

What I claim is:

1. A rocking horse, rocking chair or like device, comprising rockers, running wheels rotatably mounted on the rockers at the points where the rockers would normally be in contact with the floor when stationary, means for preventing the running wheels from rotating backwards, one substantially upright guide so mounted on the rockers as to be rotatable about its own axis near the front ends of the rockers, a rod rotatable with the guide and longitudinally movable up and down in the guide, an auxiliary running wheel journaled at the lower end of the rod, and yielding means tending to push the rod downwards out of the guide.

2. A rocking horse, rocking chair or like device, comprising rockers, running wheels rotatably mounted on the rockers at the points where the rockers would normally be in contact with the floor when stationary, means for preventing the running wheels from rotating backwards, a cross bar extending from one rocker to the other in the neighbourhood of the front ends of the rockers, a bearing mounted in the cross bar with its axis approximately vertical, a substantially cylindrical guide so mounted in the bearing as to be rotatable about its axis, a rod rotatable with the guide and longitudinally movable in the guide, an auxiliary running wheel journaled at the lower end of the rod, and yielding means tending to push the rod downwards out of the guide.

3. A rocking horse, rocking chair or like device, comprising rockers, running wheels rotatably mounted on the rockers at the points where the rockers would normally be in contact with the floor when stationary, means for preventing the running wheels from rotating backwards, one substantially upright guide so mounted on the rockers near their front ends as to be rotatable about its own axis, a rod rotatable with the guide and longitudinally movable in the guide, yielding means tending to push the rod downwards out of the guide, a transverse member rigidly secured to the lower end of the said rod, and auxiliary running wheels journaled on the said transverse member.

4. A rocking horse, rocking chair or like device, comprising rockers, running wheels rotatably mounted on the rockers at the points where the rockers would normally be in contact with the floor when stationary, means for preventing the running wheels from rotating backwards, a cross bar extending from one rocker to the other in the neighbourhood of the front ends of the rockers, a bearing mounted in the cross bar with its axis approximately vertical, a substantially cylindrical guide so mounted in the bearing as to be rotatable about its axis, abutments in the bearing and co-acting stops on the guide adapted to limit the amplitude of the rotary movements of the guide, a rod rotatable with the guide and longitudinally movable in the guide, yielding means tending to push the rod downwards out of the guide, and an auxiliary running wheel journalled at the lower end of the rod.

5. A rocking horse, rocking chair or like device, comprising rockers, running wheels rotatably mounted on the rockers at the points where the rockers would normally be in contact with the floor when stationary, means for preventing the running wheels from rotating backwards, one substantially upright guide so mounted on the rockers near their front ends as to be rotatable about its own axis, a rod rotatable with the guide and longitudinally movable in the guide, yielding means tending to push the rod downwards out of the guide, a transverse member rigidly secured to the lower end of the said rod, auxiliary running wheels journaled on the said transverse member, pedals movably mounted on the rockers, and cables operatively connecting the pedals to the transverse member for steering purposes.

6. A rocking horse, rocking chair or like device, comprising rockers, running wheels rotatably mounted on the rockers at the points where the rockers would normally be in contact with the floor when stationary, means for preventing the running wheels from rotating backwards, a relatively short substantially cylindrical guide so mounted on the rockers near their front ends as to be rotatable about its own axis in a substantially vertical position, a rod rotatable with the guide and longitudinally movable in the guide, yielding means tending to push the rod downwards out of the guide, a transverse member rigidly secured to the lower end of the said rod, auxiliary running wheels journaled on the said transverse member, two substantially upright rods so mounted on the rockers as to be movable up and down, pedals secured to the upper ends of the rods, springs constantly tending to raise the pedals, and cables so secured to the pedal rods and to the transverse member that whenever one pedal is depressed the transverse member is deflected for steering purposes.

7. A rocking horse, rocking chair or like device, comprising rockers, running wheels rotatably mounted on the rockers at the points where the rockers would normally be in contact with the floor when stationary, means for preventing the running wheels from rotating backwards, one substantially upright guide so mounted on the rockers near their front ends as to be rotatable about its own axis, a rod rotatable with the guide and longitudinally movable in the guide, yielding means tending to push the rod downwards out of the guide, an auxiliary running wheel journaled at the lower end of the rod, a foot board extending transversely from one rocker to the other at about the middle of the rockers, a brake board hinged to the foot board and adapted to retard the motion of the rocking device when depressed by the foot, and a spring constantly tending to raise the brake board clear of the ground.

8. A rocking horse, rocking chair or like device, comprising rockers, running wheels rotatably mounted on the rockers at the points where the rockers would normally be in contact with the floor when stationary, means for preventing the running wheels from rotating backwards, a foot board extending transversely from one rocker to the other at about the middle of the rockers, brake boards hinged to the foot board and adapted to retard the motion of the device by contact with the ground when depressed, braking pedals secured to the brake boards, and springs constantly tending to raise the brake boards clear of the ground.

9. A rocking horse, rocking chair or like device, comprising rockers, running wheels rotatably mounted on the rockers at the points where the rockers would normally be in contact with the floor when stationary, means for preventing the running wheels from rotating backwards, one substantially upright guide so mounted on the rockers near their front ends as to be rotatable about its own axis, a rod rotatable with the guide and longitudinally movable in the guide, yielding means tending to push the rod downwards out of the guide, an auxiliary running wheel journaled at the lower end of the rod, and steering handles secured to the top of the rod that is movably mounted in the guide, the handles being substantially parallel to the axis of the auxiliary running wheel.

10. A rocking horse, comprising rockers, running wheels rotatably mounted on the rockers at the points where the rockers would normally be in contact with the floor when stationary, means for preventing the running wheels from rotating backwards, one substantially upright guide so mounted on the rockers near their front ends as to be rotatable about its own axis, a rod rotatable with the guide and longitudinally movable in the guide, yielding means tending to push the rod downwards out of the guide, an auxiliary running wheel journaled at the lower end of the rod, a transverse member secured to the rod that is movably mounted in the guide, the ends of this transverse member protruding laterally from the horse's mouth, and reins attached to the ends of the said transverse member for steering purposes.

11. A rocking horse, rocking chair or like device, comprising rockers, running wheels rotatably mounted on the rockers at the points where the rockers would normally be in contact with the floor when stationary, means for preventing the running wheels from rotating backwards, one substantially upright guide so mounted on the rockers near their front ends as to be rotatable about its own axis, a rod rotatable with the guide and longitudinally movable in the guide, yielding means tending to push the rod downwards out of the guide, an auxiliary running wheel journaled at the lower end of the rod, and resilient buffers at the rear ends of the rockers.

12. A rocking horse, rocking chair or like device, comprising rockers, running wheels rotatably mounted on the rockers at the points where the rockers would normally be in contact with the floor when stationary, means for preventing the running wheels from rotating backwards, substantially cylindrical guides so mounted in an approximately upright position on the rockers near both ends as to be rotatable about their own axes, rods longitudinally movable in the guides, resilient means tending to push the rods downwards out of the guides, and auxiliary running wheels journaled at the lower ends of the rods.

13. A rocking horse, rocking chair or like device, comprising rockers, running wheels rotatably mounted on the rockers at the points where the rockers would normally be in contact with the floor when stationary, means for preventing the running wheels from rotating backwards, a steering guide so mounted on the rockers near their front ends as to be rotatable about a substantially vertical axis, a member movably mounted on the steering guide in such a way as always to rotate with it about the vertical axis of the guide, an auxiliary wheel journaled at the lower extremity of the said movably mounted member and adapted by contact with the floor to displace the said movably mounted member relatively to the steering guide when the front ends of the rockers descend, and resilient means constantly tending to return the said movably mounted member to its previous position when it has been so displaced.

14. A rocking horse, rocking chair or like device, comprising rockers, running wheels rotatably mounted on the rockers at the points where the rockers would normally be in contact with the floor when stationary, means for preventing the running wheels from rotating backwards, driving frames so mounted on the rockers in the neighborhood of their front and rear ends as to be capable of swinging about horizontal transverse axes near their upper edges, auxiliary running wheels journaled at the lower extremity of each driving frame and adapted by contact with the ground to constrain the driving frame to swing outwards when the ends of the rockers on which it is mounted descend, and resilient means constantly tending to swing the driving frames inwards.

15. A rocking horse, rocking chair or like device, comprising rockers, running wheels rotatably mounted on the rockers at the points where the rockers would normally be in contact with the floor when stationary, means for preventing the running wheels from rotating backwards, substantially rectangular driving frames so mounted on the rockers, in the neighborhood of the front and rear ends of the rockers, as to be capable of swinging about horizontal transverse axes near the upper edges of the said frames, axle pins forming extensions of the lower edges of the driving frames, auxiliary running wheels rotatably mounted on these axle pins, and adapted by contact with the ground to constrain the driving frame to swing outwards when the ends of the rockers on which it is mounted descend, at least one helical spring coiled round the upper member of each driving frame, and constantly tending to swing the said driving frame inwards, and stops limiting the swinging movements of the driving frames.

16. A rocking horse, rocking chair or like device, comprising rockers, running wheels rotatably mounted on the rockers at the points where the rockers would normally be in contact with the floor when stationary, means for preventing the running wheels from rotating backwards, a substantially rectangular steering frame so mounted on the rockers near their front ends as to be rotatable about a substantially vertical axis, a substantially rectangular driving frame so mounted in the steering frame as to be capable of swinging about a horizontal transverse axis near its upper edge relatively to the steering frame, while always rotating with the steering frame about the said vertical axis, axle pins forming lateral extensions of the bottom member of the driving frame, auxiliary running wheels rotatably mounted on these axle pins and adapted by contact with the ground to constrain the driving frame to swing outwards when the ends of the rockers on which it is mounted descend, and at least one spring constantly tending to swing the driving frame inwards.

17. A rocking horse, rocking chair or like device as claimed in claim 16, further comprising longitudinal guides on both sides of the rocking device, steering pedals longitudinally slidable on the said guides and adapted to be slid forwards and backwards by the feet of the user of the device, and steering rods connecting the steering pedals with the lateral extensions of the bottom member of the driving frame.

18. A rocking horse, rocking chair or like device, comprising rockers, running wheels rotatably mounted on the rockers at the points where the rockers would normally be in contact with the floor when stationary, means for preventing the running wheels from rotating backwards, resilient driving members so mounted at their upper ends on the rockers in the neighborhood of one end thereof as to be capable of yielding resiliently when their lower ends are pressed against the floor by the rocking movements of the device, and auxiliary running wheels journaled at the lower ends of the driving members.

19. A rocking horse, rocking chair or like device, comprising rockers, running wheels rotatably mounted on the rockers at the points where the rockers would normally be in contact with the floor when stationary, means for preventing the running wheels from rotating backwards, an approximately rectangular driving frame consisting of an upper horizontal member so mounted on the rockers near one end of the said rockers as to be rotatable about a substantially vertical axis, two lateral members each consisting of a blade spring, and a lower horizontal member passing through the lower ends of the blade springs and forming an axle, and auxiliary running wheels mounted on the said axle.

20. A rocking horse, rocking chair or like device, comprising rockers, running wheels rotatably mounted on the rockers at the points where the rockers would normally be in contact with the floor when stationary, means for preventing the running wheels from rotating backwards, a transverse steering member so mounted on the rockers near one end of the said rockers as to be rotatable about a substantially vertical axis, two lateral members rigidly secured to the transverse steering member and extending in directions parallel to the longitudinal axis of the rockers and away from the middle of the device, two arms articulated to the outer ends of the said lateral members, auxiliary running wheels journaled at the outer extremities of these arms, and springs tending to swing the arms downwards and inwards towards the middle of the device about their articulations to the said lateral members.

ZAHARIJE ŽIVKOVIĆ.